United States Patent
Cha et al.

(10) Patent No.: US 11,897,394 B2
(45) Date of Patent: Feb. 13, 2024

(54) HEAD UP DISPLAY AND CONTROL METHOD THEREOF

(71) Applicant: NAVER LABS CORPORATION, Seongnam-si (KR)

(72) Inventors: Jae Won Cha, Seongnam-si (KR); Jeseon Lee, Seongnam-si (KR); Kisung Kim, Seongnam-si (KR); Jongjin Park, Seongnam-si (KR); Eunyoung Jeong, Seongnam-si (KR); Yongho Shin, Seongnam-si (KR)

(73) Assignee: NAVER LABS CORPORATION, Gyeonggi-Do (KR)

( * ) Notice: Subject to any disclaimer, the term of this patent is extended or adjusted under 35 U.S.C. 154(b) by 16 days.

(21) Appl. No.: 17/380,543

(22) Filed: Jul. 20, 2021

(65) Prior Publication Data
US 2022/0063510 A1 Mar. 3, 2022

(30) Foreign Application Priority Data
Aug. 27, 2020 (KR) .................. 10-2020-0108424

(51) Int. Cl.
*B60R 11/02* (2006.01)
*B60K 35/00* (2006.01)
(Continued)

(52) U.S. Cl.
CPC .......... *B60R 11/0229* (2013.01); *B60K 35/00* (2013.01); *B60K 2370/1529* (2019.05);
(Continued)

(58) Field of Classification Search
CPC .......... B60R 11/0229; B60R 2300/205; B60R 2300/308; B60R 2300/30; B60K 35/00;
(Continued)

(56) References Cited

U.S. PATENT DOCUMENTS 10,282,915 B1 * 5/2019 Lin .................. G06T 17/00
2013/0181823 A1 7/2013 Stahlin et al.
(Continued)

FOREIGN PATENT DOCUMENTS

EP 3845861 A1 7/2021
JP 2015-065614 A 4/2015
(Continued)

OTHER PUBLICATIONS

Japanese Office Action dated Jul. 12, 2022 for corresponding JP Application No. 2021-133896.
(Continued)

*Primary Examiner* — Douglas M Wilson
(74) *Attorney, Agent, or Firm* — Harness, Dickey & Pierce, P.L.C.

(57) ABSTRACT

A head up display for a vehicle including a display device configured to output light forming an image, an optical system configured to control a path of the light such that the image is output towards a light transmission region, and a controller configured to generate the image based on a first view and a second view such that a virtual image is produced on a ground surface in the light transmission region, the first view being towards the ground surface, the second view being towards a 3D space above the ground surface, the first view and the second view being based on an eye-box, the ground surface being in front of the vehicle, and the virtual image including a graphic object having a stereoscopic effect, and control the display device to output the image.

21 Claims, 14 Drawing Sheets

(51) Int. Cl.
  *G02B 27/01* (2006.01)
  *G01C 21/36* (2006.01)
  *G09G 5/377* (2006.01)

(52) U.S. Cl.
  CPC .. *B60K 2370/1531* (2019.05); *B60Q 2400/50* (2013.01); *B60R 2300/205* (2013.01); *B60R 2300/30* (2013.01); *B60R 2300/308* (2013.01); *G01C 21/365* (2013.01); *G02B 27/01* (2013.01); *G02B 27/0101* (2013.01); *G02B 2027/014* (2013.01); *G02B 2027/0141* (2013.01); *G09G 5/377* (2013.01); *G09G 2380/10* (2013.01)

(58) Field of Classification Search
  CPC .... B60K 2370/1529; B60K 2370/1531; G02B 2027/0141; G02B 27/0101; G02B 27/01; G02B 2027/014; G02B 2027/0127; G02B 2027/013; B60Q 2400/50; G01C 21/365; G09G 5/377; G09G 2380/10
  See application file for complete search history.

(56) References Cited

U.S. PATENT DOCUMENTS

| | | | | |
|---|---|---|---|---|
| 2016/0379413 | A1* | 12/2016 | Yamamoto | G09G 5/00 345/427 |
| 2017/0146799 | A1* | 5/2017 | Oh | B60R 1/00 |
| 2019/0111844 | A1* | 4/2019 | Suzuki | B60R 1/00 |
| 2021/0107356 | A1* | 4/2021 | Watanabe | G06V 20/56 |
| 2021/0312665 | A1* | 10/2021 | Deng | H04N 23/90 |
| 2022/0107497 | A1* | 4/2022 | Murata | G01C 21/365 |

FOREIGN PATENT DOCUMENTS

| | | |
|---|---|---|
| JP | 2018159882 A | 10/2018 |
| JP | 2020112542 A | 7/2020 |
| KR | 10-2018-0063688 A | 6/2018 |
| KR | 10-2018-0097339 A | 8/2018 |
| KR | 10-2020-0040507 A | 4/2020 |
| KR | 102116783 B1 | 5/2020 |
| KR | 10-2020-0067866 A | 6/2020 |

OTHER PUBLICATIONS

Korean Office Action dated Mar. 18, 2022 for corresponding KR Patent Application No. 10- 2020-0108424.
JP Office Action dated Feb. 21, 2023 for corresponding JP patent application No. 2021-133896.
Korean Office Action dated Sep. 28, 2022 for corresponding KR patent application No. 10-2020-0108424.
Japanese office action dated Nov. 1, 2022 for corresponding JP application No. 2021-133896.

* cited by examiner

114

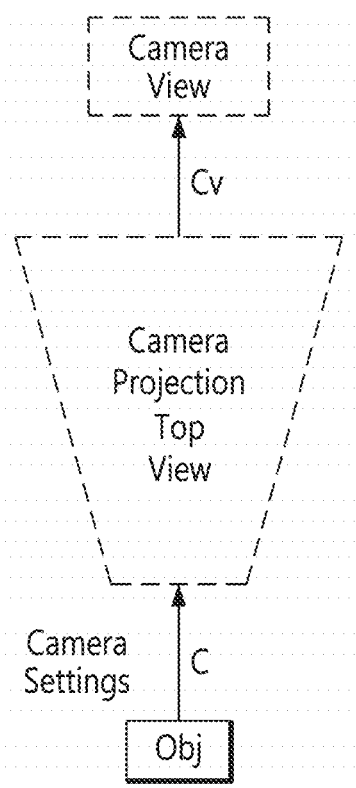

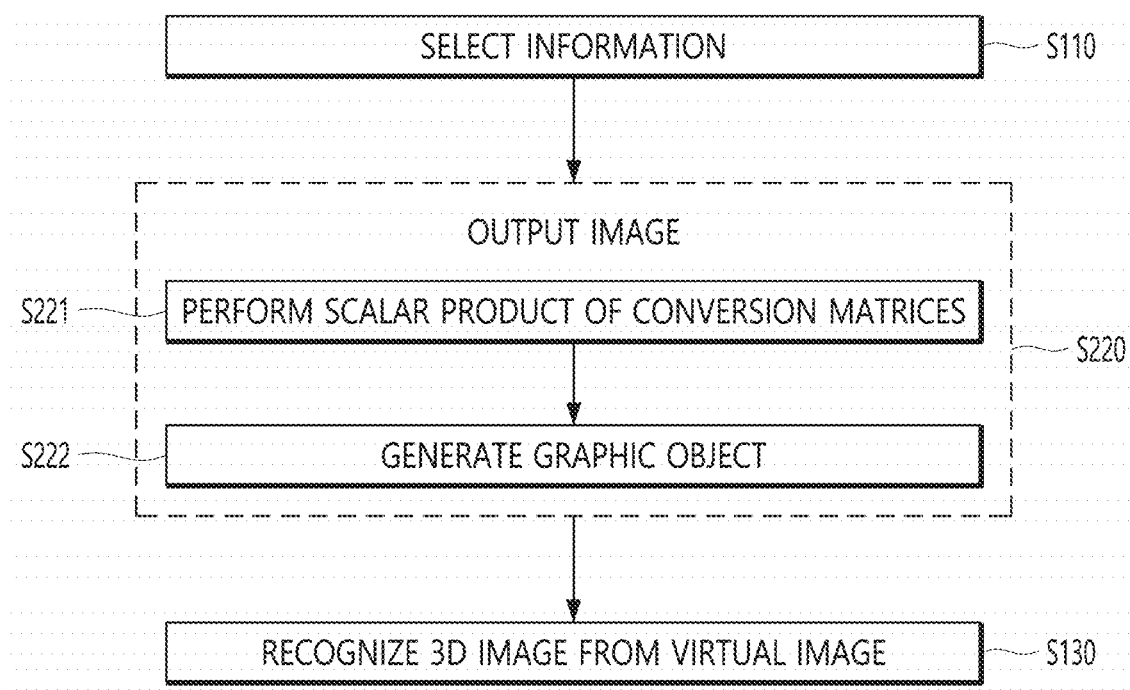

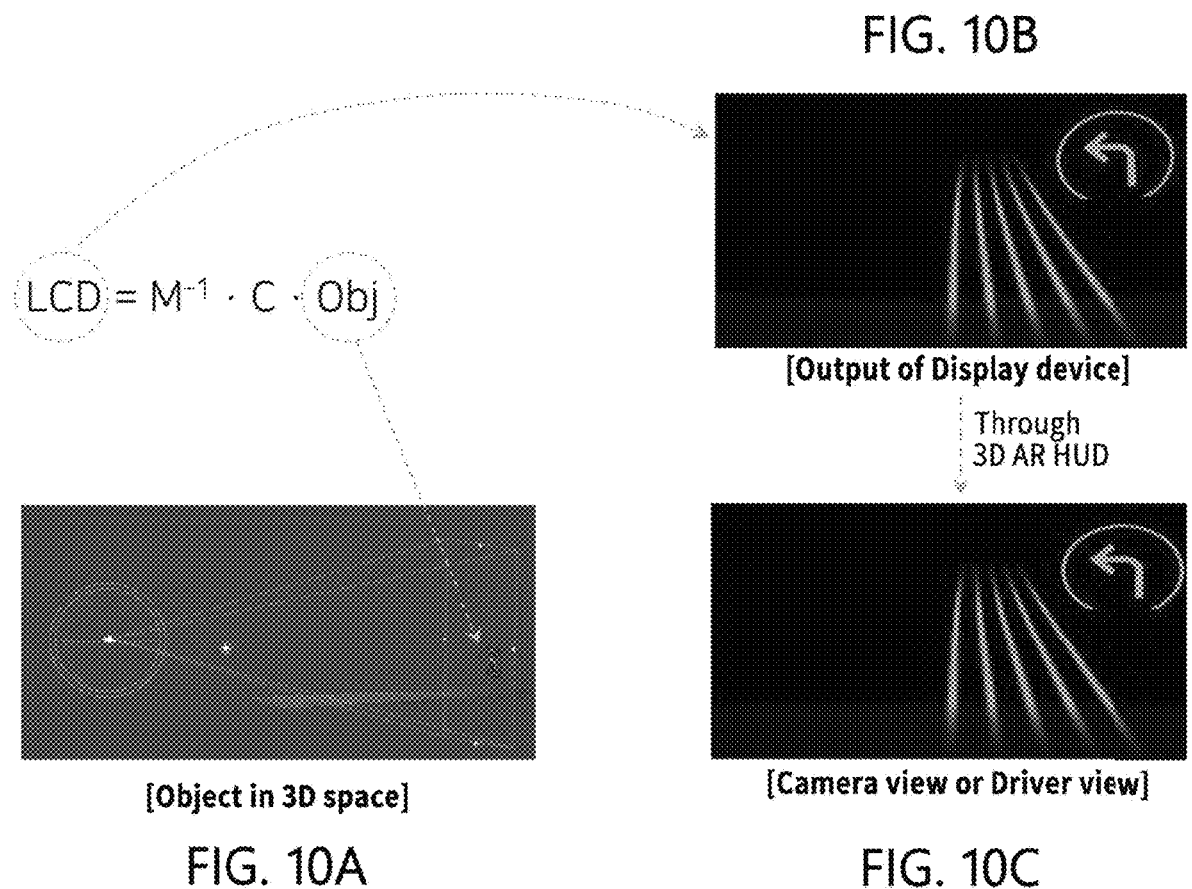

HEAD UP DISPLAY AND CONTROL METHOD THEREOF

CROSS-REFERENCE TO RELATED APPLICATION

Pursuant to 35 U.S.C. § 119(a), this application claims the benefit of the earlier filing date and the right of priority to Korean Patent Application No. 10-2020-0108424, filed on Aug. 27, 2020, the contents of which is incorporated by reference herein in its entirety.

BACKGROUND

1. Technical Field

Some example embodiments relate to a head up display for a vehicle, capable of outputting information to a front side of a driver, and a control method thereof.

2. Description of the Related Art

A Head-Up Display (HUD) for a vehicle is a device for transmitting information to a driver by projecting an image outputted from a display onto a windshield or a combiner in front of the driver as a graphic image, through an optical system.

The optical system may be configured as a plurality of mirrors or lenses to change a light path of the image transmitted from the display. The head up display for a vehicle has advantages to induce an instantaneous, or prompt, reaction of the driver and to provide convenience.

In a general head up display for a vehicle, an image is fixedly positioned at about 2~3 m in front of a user (a driver). On the contrary, a gazing (staring) distance of the driver at the time of a driving is within a range of a short distance ~about 300 m. Thus, it is inconvenient that the driver should drive while gazing at a remote distance, and should adjust a focal point of the eyes with a large width in order to check information on the head up display while driving. That is, the driver repeatedly controls the focal point of the eyes between a remote distance where a main view is positioned and ~3 m where an image was formed.

Accordingly, it would be desirable to develop a head up display capable of providing augmented reality (AR) to driving circumstances, such that a driver obtains desired information without changing a focal point of the eyes at a view at which the driver gazes while driving.

For instance, some head up displays for implementing augmented reality (AR) provide actual information at a driver view by positioning an image onto a ground surface. Like this, information is provided in a 3D manner at a driver view by making an image consistent with the ground surface. However, it may be advantageous that specific information is erected on the ground surface rather than lying down on the ground surface.

SUMMARY

Therefore, an aspect of the present disclosure is to provide a method of implementing a graphic object having a stereoscopic effect in a head up display for augmented reality (AR) which embodies AR at a driver view by positioning an image onto a ground surface.

More specifically, some example embodiments provide a method for implementing a graphic object having an erected form from an image consistent with a ground surface.

Also, some example embodiments provide a head up display for implementing an image consistent with a ground surface, and an image having an erected stereoscopic effect on the ground surface, and a control method thereof.

The head up display and the control method thereof according to some example embodiments use a process for converting a ground surface into a 3D space, generating an image in the 3D space, and then converting the image into a 2D plane corresponding to the ground surface.

More specifically, there is provided a head up display for a vehicle, including a display device configured to output light forming an image, an optical system configured to control a path of the light such that the image is output towards a light transmission region, and a controller configured to generate the image based on a first view and a second view such that a virtual image is produced on a ground surface in the light transmission region, the first view being towards the ground surface, the second view being towards a 3D space above the ground surface, the first view and the second view being based on an eye-box, the ground surface being in front of the vehicle, and the virtual image including a graphic object having a stereoscopic effect, and control the display device to output the image.

The first view may be a driver view of the ground surface, the second view may be a camera view of a virtual camera, and the controller may be configured to generate the image including making the driver view and the camera view consistent with each other.

The graphic object may be formed in the 3D space based on the camera view, and may be projected onto a 2D plane of the ground surface based on the driver view.

The controller may be configured to generate the graphic object using characteristics of the optical system, the graphic object corresponding to a 3D object projected onto the ground surface.

The controller may be configured to generate a projected image by projecting the 3D object onto the ground surface, and convert the projected image into the image using the characteristics of the optical system.

The controller may be configured to convert the 3D object into the graphic object using a scalar product of a first conversion matrix and a second conversion matrix, the first conversion matrix being configured to project the 3D object onto the ground surface to obtain a projected image, and the second conversion matrix being configured to convert the projected image into the image.

The virtual image may include a 2D graphic object formed on a virtual image plane corresponding to the ground surface, and the graphic object having the stereoscopic effect may be a 3D graphic object erected on the virtual image plane.

The image may be a single image including both the 2D graphic object and the 3D graphic object.

The 2D graphic object may include information related to at least one of a lane, a driving speed or a driving direction, and the 3D graphic object may include information related to at least one of a point of interest (POI), a guiding message, a destination or a peripheral vehicle.

The light transmission region may be a combiner or a windshield.

Some example embodiments also provide a head up display for a vehicle, including a display device configured to output an image, an image forming optical system configured to convey light corresponding to the image through a light transmission region such that a virtual image corresponding to the image appears on a ground surface in the light transmission region, the ground surface being in front of a vehicle, and a controller configured to generate the image based on an eye-box such that a 2D graphic object and a 3D graphic object appear at the ground surface in the light transmission region, the 2D graphic object corresponding to the ground surface and the 3D graphic object having a stereoscopic effect, and control the display device to output the image.

Some example embodiments also provide an image output method of a head up display for a vehicle, the method including generating an image based on a first view and a second view such that a virtual image is produced on a ground surface in a light transmission region, the first view being towards the ground surface, the second view being towards a 3D space above the ground surface, the first view and the second view being based on an eye-box, the ground surface being in front of a vehicle, and the virtual image including a graphic object having a stereoscopic effect, and controlling a display device to output the image to an optical system configured to convey the image to the light transmission region.

The method may include selecting the graphic object in response to determining information related to at least one of a point of interest (POI), a guiding message, a destination or a peripheral vehicle is to be included in the image.

In the head up display and the control method thereof according to some example embodiments, an image erected on the ground surface may be implemented in a display method to correspond an image position to the ground surface. This may allow actual information in augmented reality to be provided on the ground surface as a graphic object having a stereoscopic effect.

Also, in some example embodiments, since a graphic object having a stereoscopic effect is implemented on the ground surface, the head up display capable of enhancing readability and transmitting information in a more intuitive manner may be implemented.

Further, in some example embodiments, an image which combines a 2D graphic object and a 3D graphic object on the basis of the ground surface with each other may be implemented by data processing, by using a method to making a driver view consistent with a camera view. This may enable a single display to output different types of images.

BRIEF DESCRIPTION OF THE DRAWINGS

FIGS. 5A and 5B are conceptual views showing a method to generate a 2D ground surface image from a 3D object;

FIG. 9 is a flowchart showing another example of a data processing method using the theory of FIG. 6; and FIGS. 10A-10C show exemplary pictures of images corresponding to respective operations of FIG. 9.

DETAILED DESCRIPTION

Figure 1:
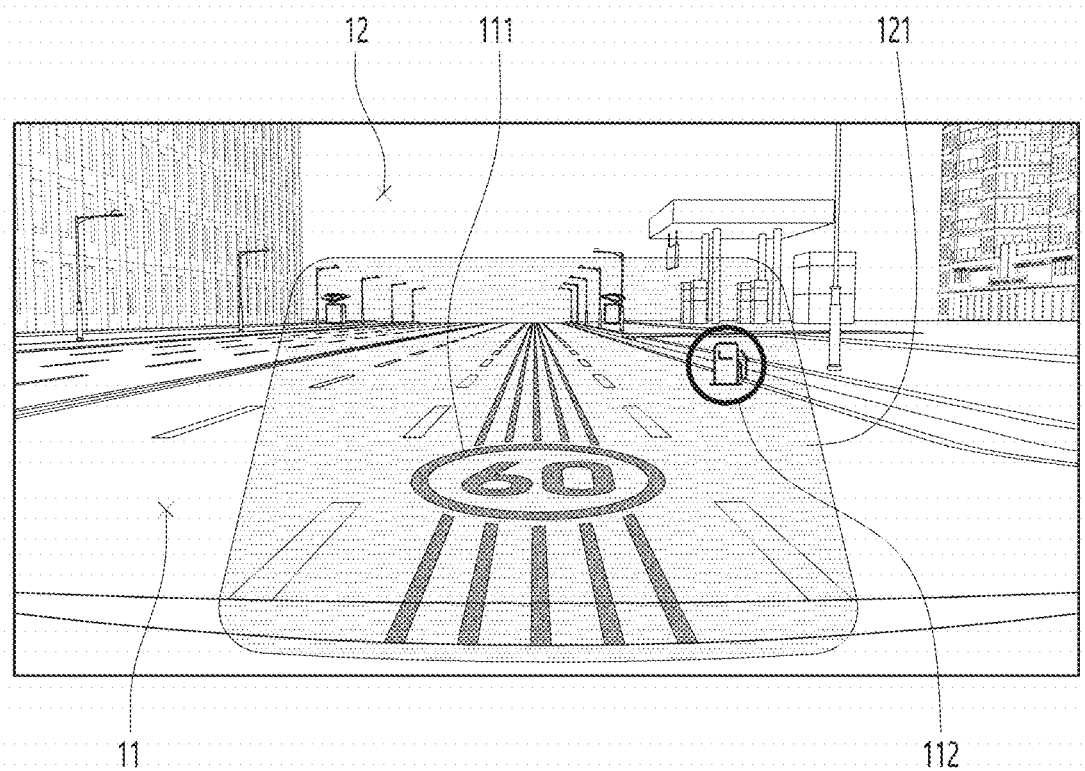
FIG. 1 is a conceptual view for explaining an image implemented in a head up display according to some example embodiments.

Description will now be given in detail according to some example embodiments disclosed herein, with reference to the accompanying drawings. For the sake of brief description with reference to the drawings, the same, similar or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In some example embodiments, that which is well-known to one of ordinary skill in the relevant art has generally been omitted for the sake of brevity. The accompanying drawings are used to help easily understand various technical features and it should be understood that some example embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, operations, functions, several components, or combinations thereof, disclosed in the specification, and it is also understood that greater or fewer features, numbers, operations, functions, several components, or combinations thereof may likewise be utilized.

Some example embodiments relate to a head up display and a control method thereof, and more particularly, to a head up display for outputting information in front of a driver of a vehicle.

The Head-Up Display (HUD) may be a display device (e.g., a screen display device) installed in front of a driver of a car (an automobile) or a pilot of an airplane, and mean a display which allows the driver or the pilot to view various types of information with keeping his or her head up. In some example embodiments, the head up display may be applied to a vehicle, and a car is referred to for convenience. However, some example embodiments are not limited to this. For instance, the vehicle may be one of various types of power devices providing locomotion of a driver, such as a car, a motorcycle, an electromotive kick board, an electric bicycle, an electromotive wheel chair, a helicopter, an airplane, a ship, construction equipment and/or a moving robot.

The head up display according to some example embodiments may be a device which allows a user to recognize various types of information with keeping his or her head up, and is applicable to various types of vehicles. Hereinafter, the head up display and the control method thereof according to some example embodiments will be explained in more detail, with taking a vehicle (e.g., an automobile) as an example for convenience.

FIG. 1 is a conceptual view for explaining an image implemented in the head up display according to some example embodiments.

FIG. 1 shows a virtual image that may be recognized by eyes of a user who is on a driver's seat of a vehicle, and shows a case where various graphic objects 111, 112 have been output. In this example, the graphic objects are output by using a combiner 121. However, the graphic objects 111, 112 may be output by a windshield using method.

In some example embodiments, an object in a real world (e.g., a sign), and/or a virtual object, represented as a graphic (or an image) in an image may be referred to as a graphic object. In this case, individual graphic objects may be implemented as object units which may be distinguished from each other independently. For instance, a graphic object corresponding to a "sign", a three-dimensional (3D) object, and a graphic object corresponding to a "lane", a two-dimensional (2D) object may exist.

In this case, a peripheral space of the vehicle may be defined as a 2D space and a 3D space. The 2D space may be a driving surface on which the vehicle runs, and the 3D space 12 may be a stereoscopic space where the vehicle runs. The driving surface may be referred to as a ground surface 11, and may be understood as a surface onto which wheels of the vehicle contact. In some example embodiments, the ground surface is not necessarily limited to the driving surface, but may be a road surface, a pedestrian passage, etc.

A user in the vehicle may view at least one of the ground surface 11 and/or the 3D space 12.

According to the head up display of some example embodiments, augmented reality (AR) information may be output to the ground surface 11 as a virtual image. For instance, a virtual image may be displayed on a substantial road surface of a view at which the user gazes.

The virtual image may be referred to as a 2D graphic object 111, because it is displayed in a 2D manner on a virtual screen located on the ground surface 11. As shown, the 2D graphic object 111 may be one of rotation information on a road where the vehicle is running, lane information, distance information from a front vehicle (e.g., a vehicle in front of the driver's vehicle), a driving direction display (or navigation information), a speed limit display, information on a lane departure warning, etc. For instance, as shown, the 2D graphic object 111 may be information related to at least one of a lane, a driving speed, and a driving direction display (or navigation information). More specifically, information on a speed limit of 60, and a driving guide within a lane are output to the ground surface as the 2D graphic object 111.

According to some example embodiments, an image may be formed by light output from the display device, and a virtual image of the image may be provided with a 2D graphic object formed on a virtual image plane corresponding to the ground surface 11. According to some example embodiments, references herein to providing a virtual image on the ground surface 11 (e.g., the virtual image plane corresponding to the ground surface 11) may involve outputting an image on a combiner and/or the windshield of the vehicle such that a user (e.g., a driver) perceives the image as a virtual image (e.g., 2D graphic objects and/or 3D graphic objects) on the ground surface 11 in front of the vehicle. According to some example embodiments, the output image may enable the user to perceive a 2D graphic object on and/or co-planar to the ground surface, and/or a 3D graphic object (e.g., based on a stereoscopic effect discussed further below) erected in a direction perpendicular to the ground surface.

As the head up display of some example embodiments may correspond a virtual screen to the ground surface, the user (e.g., a driver of the vehicle) may intuitively recognize information at various driving situations without moving a focal point of the eyes (e.g., the user's eyes) to another position. That is, a plurality of information which the head up display is to output is implemented as augmented reality (AR) on a ground surface at which the driver substantially gazes while driving.

Referring to the drawings, the head up display of some example embodiments may output a stereoscopic graphic object to the 3D space 12. More specifically, the stereoscopic graphic object may be provided with a 3D graphic object 112 erected on the virtual image plane.

The 3D graphic object 112 may be a 3D image positioned on the ground surface 11 and protruding to the 3D space 12 at least partially, and/or may be an image recognized by the user in a stereoscopic manner. For instance, the 3D graphic object 112 may be an erect image on the ground surface. And the 3D graphic object 112 may be information related to at least one of a point of interest (POI), a guiding message, a destination, and/or a peripheral vehicle.

More specifically, the erect image may be (e.g., may be implemented as) one of a first erect image and/or a second erect image which have different characteristics.

The first erect image may be a 3D image having a depth value. In this case, the first erect image may be formed by a combination of a left eye image and a right eye image, or may be implemented as a hologram.

Further, the second erect image may be an image not having a substantial depth value but recognized as a 3D image by an optical illusion, etc. Through such an optical illusion, a driver may feel as if the second erect image substantially positioned on a 2D plane is erected on a ground surface. In the following descriptions, the erect image is implemented as the second erect image. However, some example embodiments are not limited to this. The erect image may be used as a part of a method to implement the first erect image. Referring to the drawings, if there is a gas station in front of the vehicle on the right side, the vehicle recognizes information on the gas station, and the head up display outputs a gas station image to a point where the gas station is positioned.

The gas station image may be the 3D graphic object 112, and may be an image erected on the ground surface 11, for instance.

In some example embodiments, the 3D graphic object 112 having a three-dimensional effect (a cubic effect) is output onto the ground surface 11, by using the head up display which generates the 2D graphic object 111 consistent with the ground surface 11 (e.g., on and/or co-planar with the ground surface 11). That is, as shown, the gas station image having a shape erected on the ground may be output together with information on the speed limit of 60 and the driving guide lying on the ground.

In some example embodiments, a plurality of information to be transmitted through augmented reality (AR) may be provided to a ground surface at which a user gazes. In this case, as a 2D graphic object or a 3D graphic object may be selected according to a type of the information, a more intuitive head up display may be implemented. According to some example embodiments, a 2D graphic may be selected when information to be displayed includes rotation information on a road where the vehicle is running, lane information, distance information from a front vehicle (e.g., a vehicle in front of the driver's vehicle), a driving direction display (or navigation information), a speed limit display and/or information on a lane departure warning. According to some example embodiments, a 3D graphic may be selected when information to be displayed includes information related to at least one of a point of interest (POI), a guiding message, a destination, and/or a peripheral vehicle. Hereinafter, a head up display and a control method thereof according to some example embodiments will be explained in more detail with reference to the attached drawings.

Figure 2A:
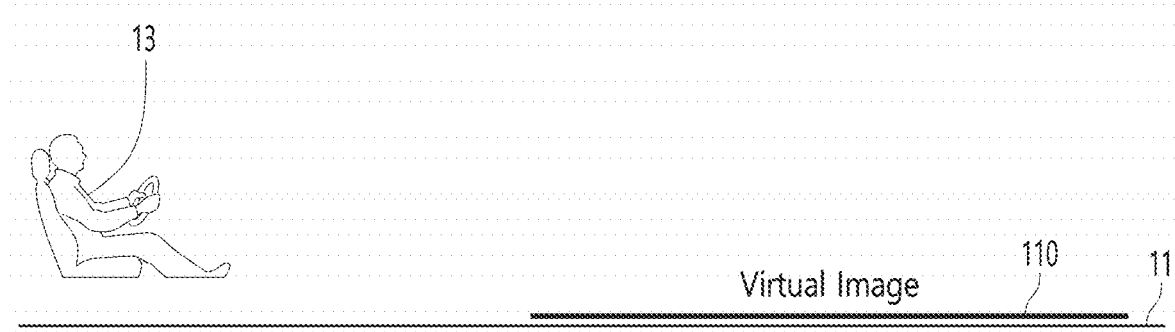
FIG. 2A is a view showing an image position of a head up display according to some example embodiments.
Figure 2B:
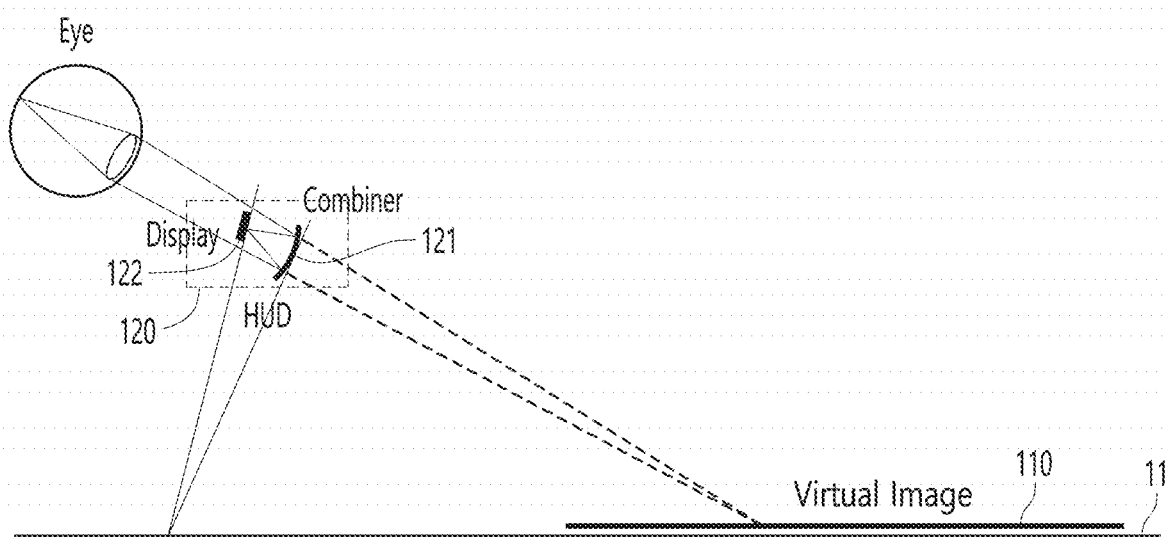
FIGS. 2B and 2C are conceptual views showing different examples of an optical design configuration for the head up display of FIG. 2A.
Figure 2C:
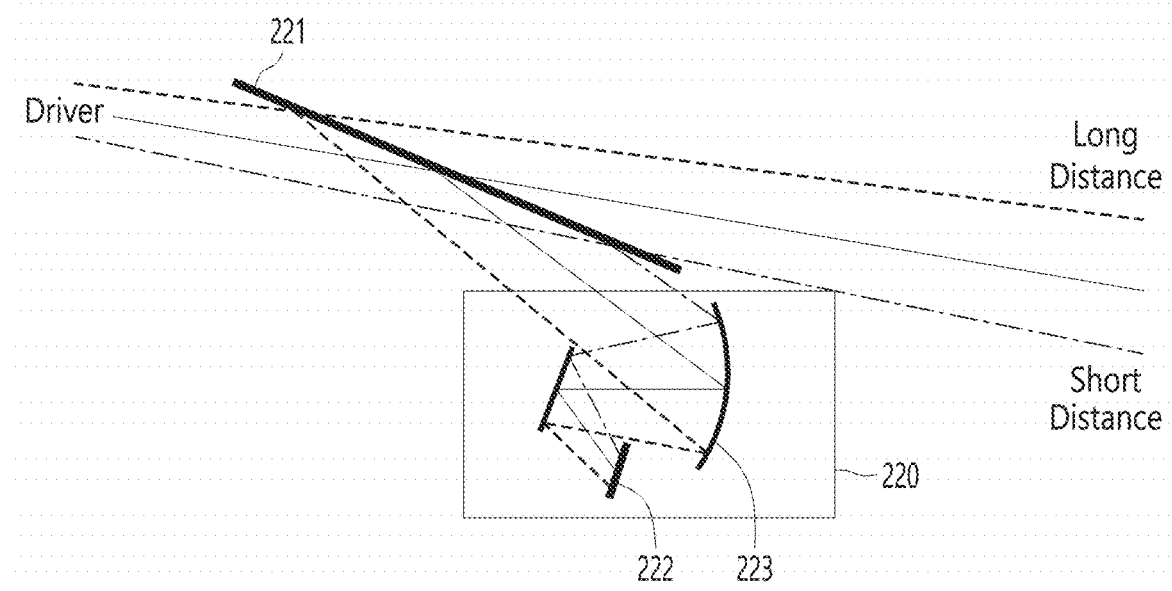
Figure 3A:
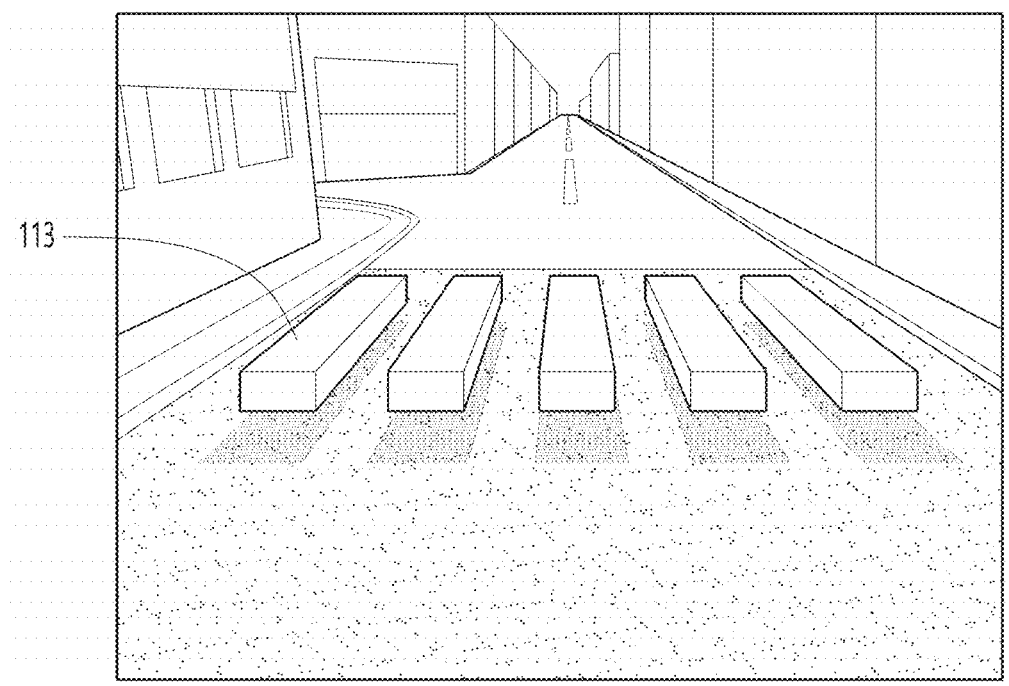
FIGS. 3A and 3B are conceptual views showing examples of images implemented in the head up display according to some example embodiments.
Figure 3B:
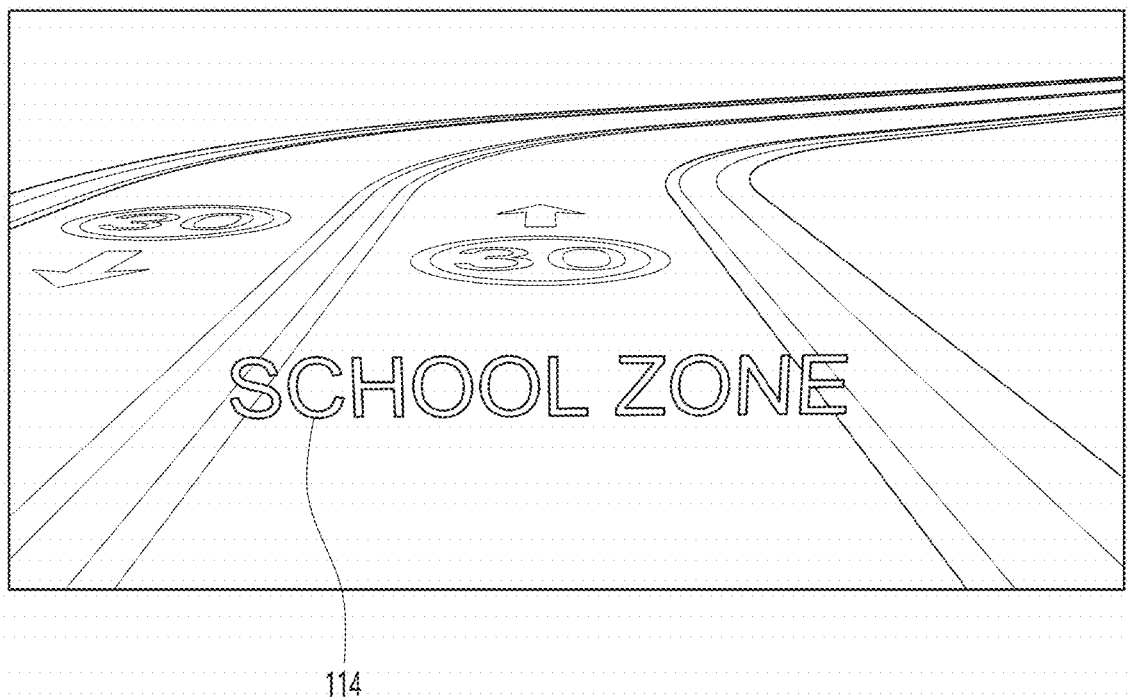

FIG. 2A is a view showing an image position of a head up display according to some example embodiments. FIGS. 2B and 2C are conceptual views showing different examples of an optical design configuration for the head up display of FIG. 2A. And FIGS. 3A and 3B are conceptual views showing examples of images implemented in the head up display according to some example embodiments.

Referring to FIG. 2A, the head up display according to some example embodiments may represent a virtual image (may also be referred to as a false image) 110 that a user 13 may view with his or her eyes, as a 3D view which is made to lie down in correspondence to the driver's front bottom, e.g., the ground surface 11. According to some example embodiments, the virtual image 110 may correspond to an image output by the display device onto a combiner, and/or the windshield of a vehicle, on and/or co-planar with a view of the user 13 of the ground surface 11. According to some example embodiments, the user 13 may perceive the virtual image 110 as a 3D image due to, for example, a stereoscopic effect provided by the image output by the display device.

An image through an optical system of a general head up display for a vehicle may be positioned at a fixed distance of 2-3 m in front of a driver, and may be perpendicular to the ground surface 11. Unlike this, the head up display according to some example embodiments may be a 3D augmented reality (AR) display, which is to locate the virtual image 110 on a virtual plane corresponding to the ground surface 11 of the front side at which the driver gazes.

In this case, the head up display may be provided with a display device (may also be referred to as a display herein) and an optical system. The head up display according to some example embodiments may be configured to generate the virtual image 110 which may be viewed by eyes, by reflection through its optical system, rather than to generate a real image through a direct projection onto a screen by a general projector.

The display device may output light, and the optical system may control a path of (e.g., conveys) the light by refraction, reflection, etc. such that an image formed by the light is output towards a light transmission region. According to some example embodiments, the optical system may include one or more mirrors and/or lenses. According to some example embodiments, the image is generated such that the virtual image appears on a ground surface in front of the vehicle in the light transmission region (e.g., in the light reflected to the user's eyes from the light transmission region).

The optical system may be an image forming optical system for forming an image of the display device. And the image forming optical system may be configured to output a virtual image on a ground surface as light spreads by passing through the light transmission region. The light transmission region may be formed at a combiner 121 (refer to FIG. 2B) or a windshield 221 (refer to FIG. 2C).

Referring to FIG. 2B, the head up display 120 according to some example embodiments may include a display device 122 and/or a combiner 121.

The display device 122 may be referred to as a display panel, a display source, etc., and may be one of a Liquid Crystal Display (LCD), a Light Emitting Diode (LED) display, a Digital Light Projector (DLP), an Organic Light Emitting Diodes (OLED) display, a Laser Diode (LD) display, and/or a Laser Beam Scanning (LBS) display.

The combiner 121 may be configured to reflect light to a user's eyes, and to transmit the light towards (and from) the outside (the front side). The combiner 121 may be formed as a single optical device or a plurality of optical devices (e.g., mirrors and/or lenses). In the following descriptions, it is assumed that the combiner 121 formed as a single optical device is used, for convenience.

An additional optical system (not shown) may be provided between the display device 122 and the combiner 121, for a higher quality of an image, or for an optimum (or smaller) size and improved performance in some cases. And the combiner 121 may be configured as a device included in the head up display 120.

It is also possible to use the windshield of the vehicle as the combiner. Referring to FIG. 2C, to use the windshield 221 of the vehicle as the combiner, a head up display 220 may include a display device 222 and/or a mirror 223.

The display device 222 may have the same features as, or similar features to, the aforementioned combiner-type display device, and thus redundant detailed explanations are not repeated.

The mirror 223 may serve to focus a virtual image (a false image) on a ground surface in front of a driver, by reflecting light of the display device 222 to the windshield 221. The windshield 221 may reflect light of an optical source reflected by the mirror 223 towards an eye-box, and may transmit light of the outside (the front side). The eye-box may be a spatial volume in which a user is able to recognize an image, which means a position of a driver's eyes.

The head up display 220 may include a structure to project light of the optical source onto the ground surface via the mirror 223 and the windshield 221, thereby allowing a virtual image to be located on (e.g., perceived as being located on) the ground surface in front of the driver. In this case, the mirror 223 may be provided with a plurality of mirrors as an optical system.

As aforementioned, in some example embodiments, both a combiner-type head up display and a windshield-type head up display may be applied, and the virtual image 110 may be arranged on the ground surface 11. Furthermore, in some example embodiments, as aforementioned with reference to FIG. 1, the 3D graphic object 112 (refer to FIG. 1) having a stereoscopic effect may be implemented from the virtual image 110 located on the ground surface 11.

Like this, in some example embodiments, a display device for implementing a 2D graphic object, and a display device for implementing a 3D graphic object may not be separately provided, but a single display device may implement a 2D graphic object and a 3D graphic object. For instance, the display device may form a single image, and the 2D graphic object and the 3D graphic object may be generated at the single image. In this case, the 2D graphic object and the 3D graphic object may be selectively generated, or may be simultaneously or contemporaneously generated.

As an example of the 3D graphic object, as shown in FIG. 3A, obstacle images 113 may be formed on the ground surface in order to prevent an overspeed of the vehicle at a crossing, or reduce the probability or frequency of such an overspeed. As another example, as illustrated in FIG. 3B, a guiding message 114 indicating information on peripheral circumstances may be output to the ground surface in an erected manner. The guiding message 114 is implemented in the form of erected letters when viewed from the eye-box, thereby providing a high readability to the driver.

As shown in FIGS. 3A and 3B, the head up display of some example embodiments may output 3D graphic information onto the ground surface, thereby providing more intuitive information to the driver.

Main information provided from a vehicle navigation may include route information on a road where the vehicle is running, lane information, distance information from a front vehicle, etc. In an Advanced Driver-Assistance System (ADAS), information related to safety may be provided to a user. The information may include lane information, distance information from a front vehicle/a next vehicle, unexpected (e.g., sudden, urgent and/or emergency) information, etc. Likewise, at the time of an autonomous driving, a vehicle which is a subject of a driving may provide information about situations to occur later, such as a rotation on a road or a lane change, to a driver. Route information may include information to guide routes, which may include turn-by-turn (TBT) information to guide going straight, a rotation, etc.

The plurality of information may be selected as one of a 2D graphic object and/or a 3D graphic object, and may be implemented on the ground surface by the head up display of some example embodiments.

The head up display may provide 3D graphic information on the ground surface as a virtual image, and may include a controller (not shown) for controlling the display device such that an image corresponding to the virtual image is formed at the display device. The controller may generate the image by using a first view which is towards the ground surface on the basis of an eye-box, and a second view which is towards a 3D space above the ground surface, such that the virtual image includes a graphic object having a stereoscopic effect on the basis of the ground surface. However, some example embodiments are not limited to this. For instance, an image generation may be implemented by an additional device such as a server or a computer. In this case, a generated image may be transmitted to the vehicle or the head up display through communications (e.g., wired and/or wireless communications).

Like this, in some example embodiments, an image may be generated from the display device by using a method to make different views consistent with each other.

In this case, the first view may be a driver view for recognizing the virtual image on the ground surface, and the second view may be a camera view of a virtual camera. And the image may be generated by making the driver view and the camera view consistent with each other. According to some example embodiments, the graphic object may be formed in the 3D space based on the camera view, and is projected onto a 2D plane of the ground surface based on the driver view. Hereinafter, a method to generate an image from the display device will be explained in more detail.

More specifically, hereinafter, will be explained a method for the controller to output a 3D graphic object having a stereoscopic effect onto the ground surface, by using the head up display which implements an image on the ground surface.

Figure 4:
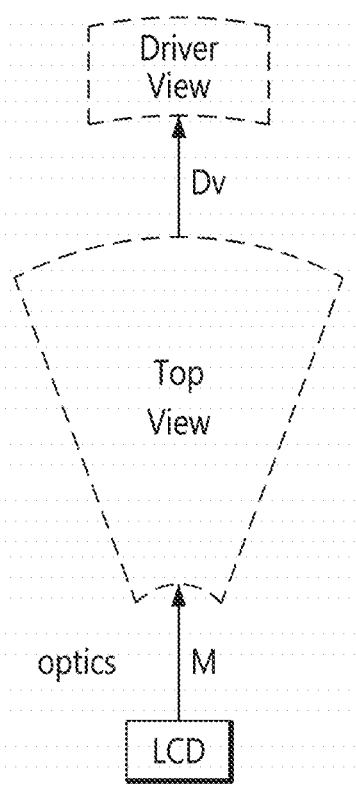
FIG. 4 is a conceptual view showing an image generation method of a display device which displays a virtual image on a ground surface.
Figure 5B:
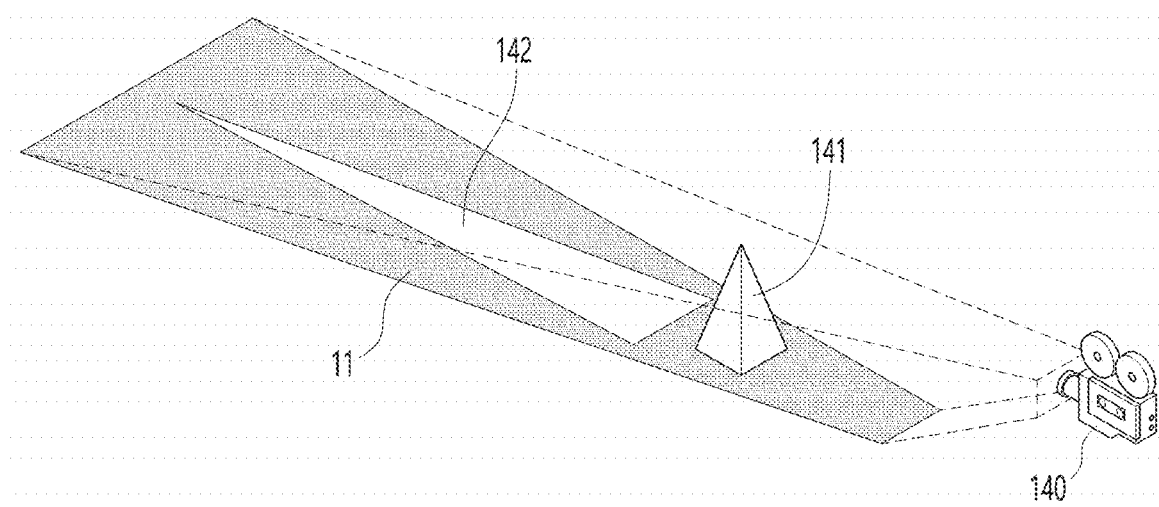
Figure 6:
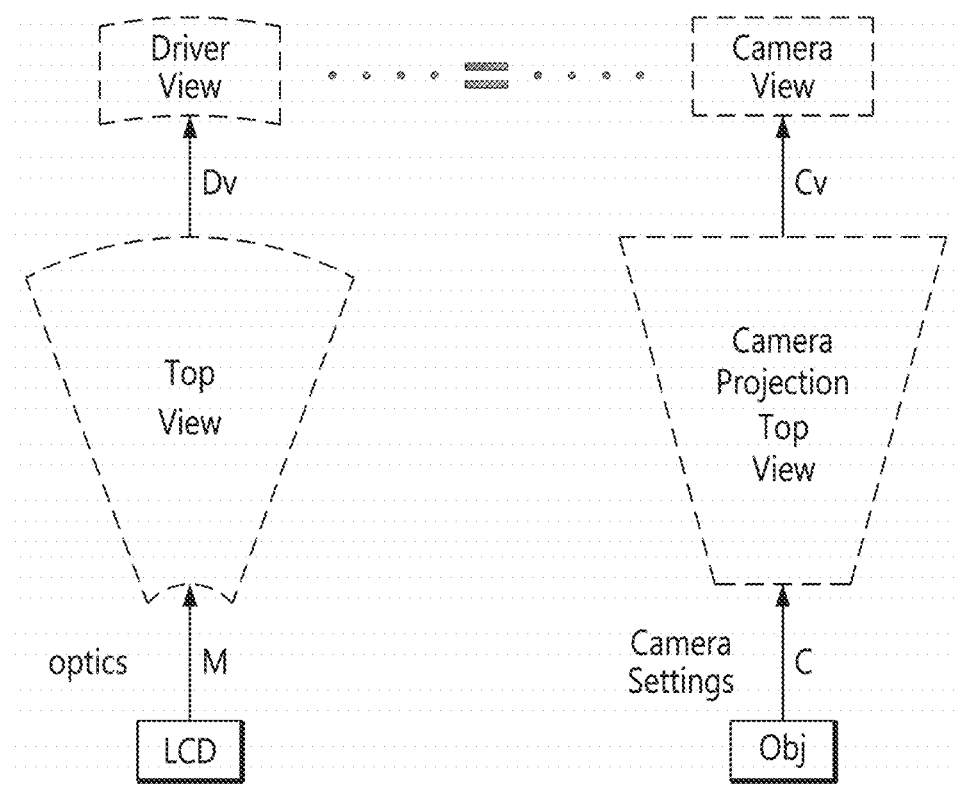
FIG. 6 is a conceptual view for explaining a theory which combines a 3D object image with a 2D ground surface image generation method.

FIG. 4 is a conceptual view showing an image generation method of the display device which displays a virtual image on the ground surface. FIGS. 5A and 5B are conceptual views showing a method to generate a 2D ground surface image from a 3D object. And FIG. 6 is a conceptual view for explaining a theory which combines a 3D object image to a 2D ground surface image generation method.

In some example embodiments, an image viewed as an erect form at a driver view may be implemented on the ground surface. For this, the head up display may convert a 2D space for generating an image (e.g., the ground surface, a 2D image plane) into a 3D space, and generate an erect image in the 3D space. Then, the head up display may convert the generated image into the 2D space.

FIG. 4 shows a process of viewing, by the driver, an image generated from the display device (LCD) of the head up display which locates an image onto the ground surface. The controller may obtain an image. According to some example embodiments, the image may be obtained from a memory in the head up display, from another device (e.g., via wired and/or wireless communication), generated by an application running on the head up display, etc. Then, the image may be converted (e.g., by the controller) into an image displayed on (e.g., that may be perceived as being oriented on and/or co-planar with) the ground surface by a conversion matrix M to which characteristics of the optical system of the head up display have been reflected.

The conversion matrix M may be defined as a mapping matrix including an index for mapping as a top-view in the display device (LCD), and may be used to convert an image of the display device (LCD) into a top-view image viewed from the upper side on the basis of the ground surface. That is, an image of the display device (LCD) may be converted into a top-view image by reflecting characteristics of the optical system of the head up display. The characteristics of the optical system of the head up display may be characteristics of an image forming optical system (e.g., one or more mirrors and/or lenses) which outputs a virtual image positioned on the ground surface.

Then, the top-view image may be converted (e.g., by the controller) into an image that the driver views as a 3D view from an image displayed on the ground surface, by a conversion matrix Dv according to a relation between a driver's position and the ground surface where an image has been displayed. The driver's position may mean a position including a height of the eyes (e.g., the driver's eyes).

By such an image generation method, the user on a driving seat of the vehicle may recognize an image outputted from the display device (LCD) on the ground surface, which may be defined as an image of a driver view. According to some example embodiments, in response to recognizing the image and/or contemporaneous with the image being output, the user may control the vehicle based on information included in the image to, for example, change a speed of the vehicle, change a lane on which the vehicle drives, turn the vehicle, drive the vehicle to a particular location, etc.

FIGS. 5A and 5B partially show a process of viewing, by the driver, an image freely generated in 3D space, without a limitation to the ground surface. That is, a process of converting a 3D object into a 2D ground surface image is shown.

Firstly, under an assumption that a virtual camera 140 views a specific object (Obj) 141 (e.g., an object corresponding to a graphic object), the specific object (Obj) 141 is positioned in 3D space within a field of view (FoV) of the virtual camera 140. The specific object (Obj) 141 may be converted (e.g., by the controller) into an image 142 that an object in 3D space is projected onto the ground surface according to a position and an angle of the camera, by a conversion matrix C for projecting an object onto the ground surface according to a position and an angle of a camera (or a driver view). More specifically, the image may be converted into a top-view image viewed from the upper side through a camera projection, by using the conversion matrix C for projecting an object within a field of view of a camera onto the ground surface.

In this case, since the 3D space at which the virtual camera gazes has no distortion, the top-view image viewed from the upper side through a camera projection in FIG. 5A may be a straight trapezoid. This is differentiated from the bent top-view image of FIG. 4.

Then, the top-view image viewed from the upper side may be implemented as an image projected onto the ground surface and viewed by the virtual camera as a 3D view (e.g., by the controller), by using a matrix Cv which represents a relation between the virtual camera and an image on the ground surface. By such a method, an object in 3D space may be converted into an image projected onto the ground surface when the virtual camera views as a 3D view.

The aforementioned method to convert a 3D object into a 2D ground surface image may be integrated (combined) with an image generation method by the head up display according to some example embodiments. That is, an object in 3D space may be converted into a 3D graphic, and then may be located on the ground surface. More specifically, FIG. 6 shows a method to combine an object in 3D space with the head up display according to some example embodiments.

The image generation method of the display device which outputs a virtual image on the ground surface aforementioned with reference to FIG. 4 may be combined with the method to generate an object in 3D space into a 3D graphic aforementioned with reference to FIGS. 5A and 5B. By such a combination, the driver may view and recognize a 3D graphic object having a stereoscopic effect through the head up display, at a camera view to view an object positioned in 3D space. The object positioned in 3D space may be generated as information desired to be transmitted to the driver through the head up display. By such a method, information desired to be transmitted as a 3D graphic object may be output onto the ground surface with a stereoscopic effect, through the head up display of some example embodiments.

For this, a position of the virtual camera in 3D space may be consistent with a substantial position of an eye-box of the driver. From this, a condition that a driver view and a camera view are the same, or similar, may be established (e.g., by configuring the camera view to be from the same position and at the same angle as, or from a similar position and at a similar angle to, that of the driver view).

Thus, the 2D graphic object and the 3D graphic object may be generated through different view processes on the basis of the eye-box. That is, the 2D graphic object may be generated in consideration of only the driver view, whereas the 3D graphic object may be generated by making the driver view and the camera view on the basis of the eye-box consistent with each other.

By the condition, a graphic object having a stereoscopic effect, outputted from the head up display, may be formed in the 3D space on the basis of the camera view, and may be projected onto a 2D plane of the ground surface on the basis of the driver view.

More specifically, under the condition, in order to generate a specific object (Obj) desired to be implemented in 3D space from the head up display at which the driver gazes, an image substantially outputted from the display device (e.g., LCD) may be derived from the following formula (1).

$$LCD = M^{-1} \cdot D_V^{-1} \cdot C_V \cdot C \cdot Obj \quad (1)$$

In formula (1), $C_V$ may be equal to $C^{-1}$ ($C_V = C^{-1}$). The reason is because an image of the specific object (Obj) according to a position and an angle of the virtual camera is projected onto the ground surface, and then an image viewed by the virtual camera at the same position and angle, or similar positions and angles, is obtained.

Further, $D_V$ may be equal to $C_V$ ($D_V = C_V$). The reason is because conditions to view an image on the ground surface by the virtual camera and the driver become the same or similar, if a position of the virtual camera is made to be consistent with the driver's eyes, more precisely, a position of the eye-box.

Thus, the above equation (1) may be summarized as the following equation (2).

$$LCD = M^{-1} \cdot C \cdot Obj \quad (2)$$

Like this, the method to output a 3D graphic object to the ground surface by the head up display of some example embodiments may be a method to convert the specific object (Obj) corresponding to information desired to be transmitted into an image substantially outputted from the display device (LCD) by using $M^{-1}$ and C. In equation (2), the $M^{-1}$ may be an inverse conversion matrix of a conversion matrix to which characteristics of the optical system of the head up display of some example embodiments have been reflected. And the C may be a conversion matrix for projecting the specific object (Obj) 141 onto the ground surface according to a position and an angle of the camera (or the driver view).

The controller of the head up display may generate the graphic object that a 3D object has been projected onto the ground surface, by using characteristics of the optical system which projects a 3D object corresponding to the graphic object onto the ground surface, and which converts the image into the virtual image.

Theoretically, some example embodiments provide a control method to derive an image of the display device (LCD) which outputs a 3D graphic object to the ground surface, by using the equation (2). Hereinafter, the control method of the head up display according to some example embodiments will be explained in more detail with reference to FIGS. 7 to 10C.

Figure 7:
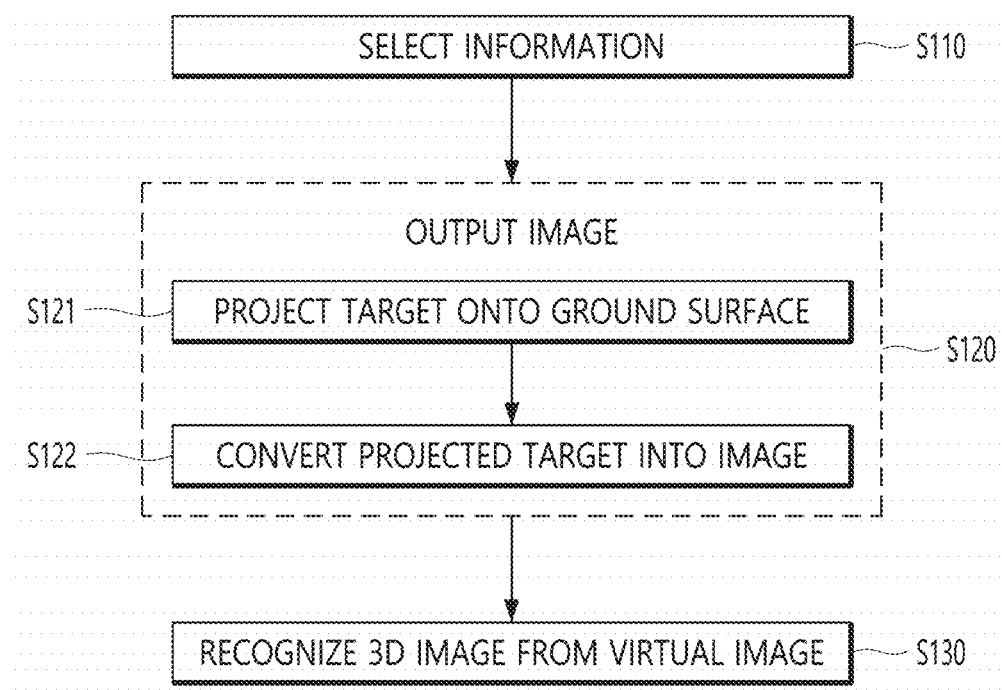
FIG. 7 is a flowchart showing an example of a data processing method using the theory of FIG. 6.
Figure 8:
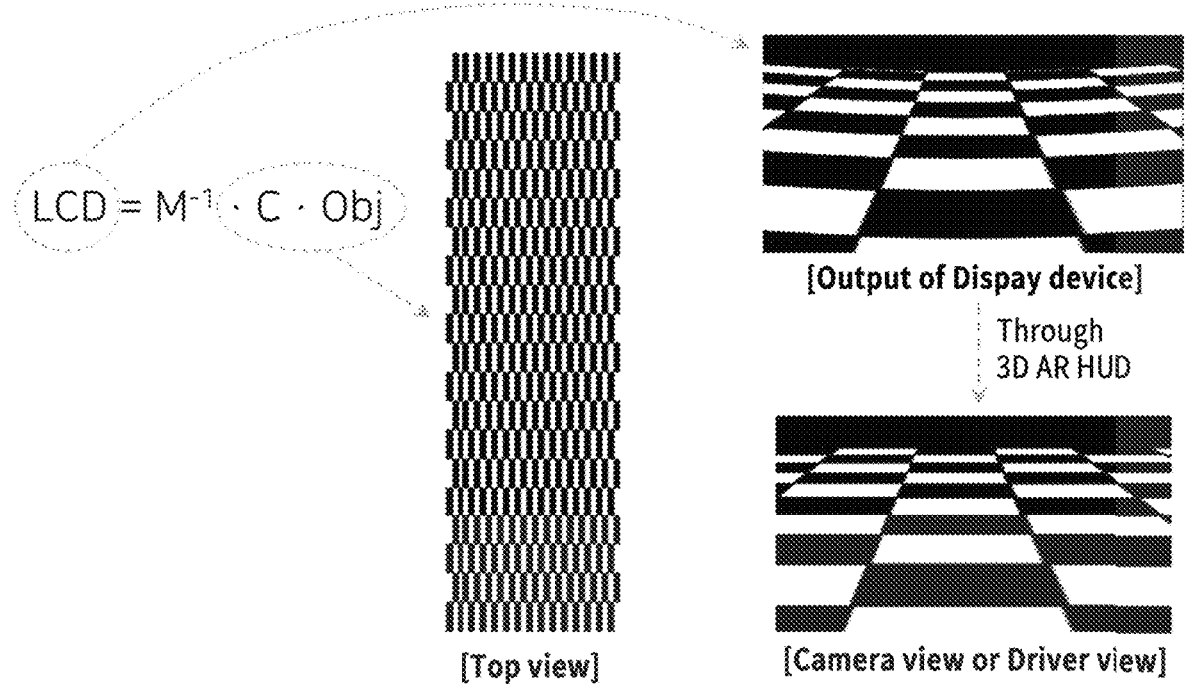
FIG. 8 shows exemplary pictures of images corresponding to respective operations of FIG. 7.

FIG. 7 is a flowchart showing an example of a data processing method using the theory of FIG. 6. FIG. 8 shows exemplary pictures of images corresponding to respective operations of FIG. 7. FIG. 9 is a flowchart showing another example of a data processing method using the theory of FIG. 6. And FIGS. 10A-10C show exemplary pictures of images corresponding to respective operations of FIG. 9.

Firstly, with reference to FIGS. 7 and 8, will be explained a method to derive an image to be generated from the display device (LCD) by obtaining C·Obj in the equation (LCD=$M^{-1}$·C·Obj), and then by performing a scalar product (a dot product) with respect to the resultant value with $M^{-1}$. In this case, the C·Obj may be derived by a simulation.

Referring to FIG. 7, according to the control method of the head up display of some example embodiments, information to be transmitted through the head up display may be selected (S110).

The information to be transmitted may be information represented by the 2D graphic object and/or the 3D graphic object aforementioned with reference to FIGS. 1 to 3B. For instance, as shown in FIG. 1, if there is a gas station at the front side, a position, or the existence or non-existence, of the gas station may be the information to be transmitted, and an image of the gas station may be a 3D graphic object.

Then, an image generated by the display device may be output (S120) by using the optical system which arranges a virtual image of the image on the ground surface in front of the vehicle.

In this case, in S120 of outputting the image, the image may be generated by using a first view which is towards the ground surface on the basis of the eye-box and a second view which is towards a 3D space above the ground surface on the basis of the eye-box, such that the virtual image includes a graphic object having a stereoscopic effect on the basis of the ground surface.

The first view may be a driver view that a user on a driver's seat of the vehicle gazes at the ground surface. And the second view may be a camera view that the virtual camera gazes at the front side of the vehicle. As aforementioned with reference to FIG. 6, in the operation of outputting the image, the image is generated by using a method to make the first view and the second view consistent with each other.

As shown, the S120 of outputting the image may include a projection operation (S121) and a conversion operation (S122). In these operations, a 3D object (or information), and/or a target of the 3D graphic object, may be projected onto the ground surface for generation of an image, and the projected image may be converted into an image corresponding to the virtual image by using a characteristic of the optical system.

For instance, the projection operation (S121) may be an operation of projecting a target corresponding to the graphic object, on the basis of the eye-box, onto the ground surface. This may be an operation of obtaining C·Obj in the equation (LCD=$M^{-1}$·C·Obj), which may be an operation of obtaining an image (e.g., an intermediate image) by projecting a specific object onto the ground surface according to a position and an angle of the camera. According to some example embodiments, the specific object may refer to a desired graphic object, and Obj may refer to an image of the specific object (e.g., a matrix of pixel values).

FIG. 8 shows an image obtained by projecting a target corresponding to the graphic object onto the ground surface. The image is a top-view image obtained by viewing the ground surface from the upper side (e.g., from above), and black and white regions are formed in a repeated and consecutive manner in the drawing.

Then, the conversion operation (S122) may be an operation of converting the image of the target projected onto the ground surface into an image generated by the display device by reflecting characteristics of the optical system, such that the graphic object becomes the virtual image.

If the image derived through such processes is output to the display device, the user may recognize a 3D graphic object (or a 3D image) from the virtual image positioned on the ground surface (S130).

More specifically, an image to be generated by the display device (LCD) may be derived by performing a scalar product with respect to the resultant value (C·Obj) with $M^{-1}$.

Referring to FIG. 8, an image to be substantially outputted from the LCD was derived through the above method, and the user recognizes a stereoscopic image at the driver view through the head up display of some example embodiments.

The head up display may be additionally provided with a controller to perform the control method thereof.

Next, with reference to FIGS. 9 and 10A-10C, will be explained a method to derive an image to be generated from the display device (LCD) by obtaining $M^{-1}$·C in the equation (LCD=$M^{-1}$·C·Obj), and then by performing a scalar product with respect to the resultant value with Obj. In this case, the C may be set by a simulation, and the M may be set by a design of the optical system.

For instance, referring to FIG. 9, S220 of outputting the image in the control method of the head up display may include a scalar product operation of conversion matrices (S221), and a graphic object generation operation (S222). In these operations, the controller of the head up display may convert a 3D object (or information) corresponding to the 3D graphic object, into the graphic object, by using a scalar product of a first conversion matrix for projecting the 3D object onto the ground surface, and a second conversion matrix for converting the virtual image into the image.

For instance, in the scalar product operation of conversion matrices (S221), a scalar product of a first conversion matrix and a second conversion matrix may be obtained. The first conversion matrix may be C that the camera projects an object onto the ground surface. And the second conversion matrix may be an inverse matrix of M for mapping into a top view by the display device of the head up display.

Next, in the graphic object generation operation (S222), a 3D object may be converted into a graphic object by using a resultant value of the scalar product.

Referring to FIGS. 10A-10C, it may be seen that an object positioned in 3D space may be converted into an image substantially outputted from the display device, by the control method in some example embodiments.

As a detailed example, referring to FIG. 10A, an arrow indicating a left turn is positioned in 3D space as an erect image, a 3D object. And lines indicating a driving direction are arranged on a 2D plane in parallel to the ground surface. If such objects undergo an image conversion by the control method in some example embodiments, an image to be output to the display device (LCD) may be derived as shown in FIG. 10B. Further, as shown in FIG. 10C, the user may recognize a 2D graphic object indicating a driving direction and a 3D graphic object indicating a left turn, through the head up display of some example embodiments.

As aforementioned, in the head up display and the control method thereof according to some example embodiments, an image erected on the ground surface may be implemented in a display method to correspond an image position to the ground surface. This may allow actual information in augmented reality to be provided on the ground surface as a graphic object having a stereoscopic effect.

Conventional Head-Up Displays (HUDs) display an image at an excessively short focal distance or as a 2D image on the ground surface. A driver viewing the conventional HUD changes his or her focal point in order to view the information contained in the image. Accordingly, the driver is inconvenienced by the frequent changes of focal point involved in using the conventional HUD, and/or the potential for an accidental collision increases as the driver's focal point is drawn away from its normal position (e.g., at the horizon, at the level of traffic signs/pedestrians, etc.).

However, some example embodiments provide an improved HUD that outputs 3D augmented reality images.

The 3D images may extend perpendicular to the ground surface, and thus, may provide information at the driver's normal focal point (e.g., at the horizon, at the level of traffic signs/pedestrians, etc.). Accordingly, a driver using the improved HUD does not change his or her focal point in order to view the information contained in the 3D images. Thus, the improved HUD overcomes the deficiencies of the conventional HUDs to reduce driver inconvenience and/or reduce the potential for an accidental collision.

According to some example embodiments, operations described herein as being performed by the controller, the head up display, the display device, the server and/or the computer may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

One or more of the aforementioned operations may be executed by one or more processes in a computer, and may be implemented as a program which may be stored in a computer-readable medium.

Further, one or more of the aforementioned operations may be implemented as a computer-readable code or instruction word (e.g., a program) in a program-recorded medium.

The computer-readable medium may include all types of recording devices for storing data which may be read by a computer system. Examples of the computer-readable medium include a Hard Disk Drive (HDD), a Solid State Disk (SSD), a Silicon Disk Drive (SDD), Read-Only Memory (ROM), Random Access Memory (RAM), Compact Disk ROM (CD-ROM), a magnetic tape, a floppy disk, an optical data storage device, etc.

Further, the computer-readable medium may include a storage unit which may be a server and/or a cloud storage unit which an electronic device may access through communications. In this case, the computer may download a program of configured to implement one or more of the aforementioned operations from the server and/or the cloud storage unit, through wired and/or wireless communications.

The configurations and methods of the head up display and the control method thereof in the aforesaid examples may not be limitedly applied, but such examples may be configured by a selective combination of all or part of some example embodiments so as to implement many variations.

What is claimed is:

1. A head up display for a vehicle, comprising:
a display device configured to output light forming an image;
an optical system configured to control a path of the light such that the image is output towards a light transmission region; and
a controller configured to,
generate the image based on a first view and a second view such that a virtual image is produced on a ground surface in the light transmission region, the first view being towards the ground surface, the second view being towards a 3D space above the ground surface, the first view and the second view being based on an eye-box, the ground surface being in front of the vehicle, the virtual image including a graphic object having a stereoscopic effect, and
control the display device to output the image,
wherein the optical system is configured to output the virtual image corresponding to the image on the ground surface,
wherein the controller is configured to generate the graphic object with respect to the ground surface by using the optical system, and
wherein the graphic object is generated by,
making the first view and the second view on the basis of the eye-box consistent with each other, and
projecting a first object onto the ground surface using a first conversion matrix, the first object corresponding to the graphic object, and the first conversion matrix corresponding to the first view and the second view.

2. The head up display for a vehicle of claim 1, wherein the first view is a driver view of the ground surface; the second view is a camera view of a virtual camera; and the controller is configured to generate the image including making the driver view and the camera view consistent with each other.

3. The head up display for a vehicle of claim 2, wherein the first object is formed in the 3D space based on the camera view, and
the projecting including projecting the first object onto a 2D plane of the ground surface based on the driver view.

4. The head up display for a vehicle of claim 1, wherein the controller is configured to generate the graphic object using characteristics of the optical system, and
the first object is a 3D object.

5. The head up display for a vehicle of claim 4, wherein the controller is configured to:
generate a projected image by projecting the 3D object onto the ground surface; and
convert the projected image into the image using the characteristics of the optical system.

6. The head up display for a vehicle of claim 4, wherein the controller is configured to convert the 3D object into the graphic object using a scalar product of the first conversion matrix and a second conversion matrix, the first conversion matrix being configured to project the 3D object onto the ground surface to obtain a projected image, and the second conversion matrix being configured to convert the projected image into the image.

7. The head up display for a vehicle of claim 1, wherein the virtual image includes a 2D graphic object formed on a virtual image plane corresponding to the ground surface; and
the graphic object having the stereoscopic effect is a 3D graphic object erected on the virtual image plane.

8. The head up display for a vehicle of claim 7, wherein the image is a single image including both the 2D graphic object and the 3D graphic object.

9. The head up display for a vehicle of claim 7, wherein the 2D graphic object includes information related to at least one of a lane, a driving speed or a driving direction, and the 3D graphic object includes information related to at least one of a point of interest (POI), a guiding message, a destination or a peripheral vehicle.

10. The head up display for a vehicle of claim 1, wherein the light transmission region is at a combiner or a windshield.

11. The head up display for a vehicle of claim 1, wherein the making the first view and the second view consistent with each other includes configuring a third conversion matrix to be equal to a fourth conversion matrix, the third conversion matrix representing the second view, and the fourth conversion matrix representing the first view.

12. A head up display for a vehicle, comprising:
a display device configured to output an image;
an image forming optical system configured to convey light corresponding to the image through a light transmission region such that a virtual image corresponding to the image appears on a ground surface in the light transmission region, the ground surface being in front of a vehicle; and
a controller configured to,
generate the image based on an eye-box such that a 2D graphic object and a 3D graphic object appear at the ground surface in the light transmission region,
the 2D graphic object corresponding to the ground surface and the 3D graphic object having a stereoscopic effect,
the eye-box being defined based on a viewing angle of a driver of the vehicle, the 3D graphic object corresponding to a 3D object projected onto the ground surface using a first conversion matrix, the first conversion matrix corresponding to a first view and a second view,
the first view being towards the ground surface, the second view being towards a 3D space above the ground surface, and the first view and the second view being based on the eye-box, and
control the display device to output the image.

13. The head up display of claim 12, wherein the controller is configured to generate the 3D graphic object using characteristics of the image forming optical system.

14. A control method of a head up display for a vehicle, comprising:
generating an image based on a first view and a second view such that a virtual image is produced on a ground surface in a light transmission region, the first view being towards the ground surface, the second view being towards a 3D space above the ground surface, the first view and the second view being based on an eye-box, the ground surface being in front of a vehicle, the virtual image including a graphic object having a stereoscopic effect; and
controlling a display device to output the image to an optical system configured to convey the image to the light transmission region,
wherein the virtual image is produced by an optical system configured to control a path of light such that the image formed by the light is output towards the light transmission region,
wherein the graphic object is generated by using the optical system, and
wherein the graphic object is generated by,
making the first view and the second view on the basis of the eye-box consistent with each other, and
projecting a first object onto the ground surface using a first conversion matrix, the first object corresponding to the graphic object to obtain a projected image, and the first conversion matrix corresponding to the first view and the second view.

15. The method of claim 14, wherein the generating an image comprises:
converting the projected image into the image based on characteristics of the optical system.

16. The method of claim 14, wherein
the first object is a 3D object; and
the generating an image comprises generating the graphic object using a scalar product of the first conversion matrix and a second conversion matrix, the first conversion matrix being configured to project the 3D object onto the ground surface to obtain the projected image, and the second conversion matrix being configured to convert the projected image into the image.

17. The method of claim 14, wherein
the virtual image includes a 2D graphic object formed on a virtual image plane corresponding to the ground surface; and
the graphic object having the stereoscopic effect is a 3D graphic object erected on the virtual image plane.

18. The method of claim 17, wherein the image is a single image including both the 2D graphic object and the 3D graphic object.

19. The method of claim 17, wherein the 2D graphic object includes information related to at least one of a lane, a driving speed or a driving direction, and the 3D graphic object includes information related to at least one of a point of interest (POI), a guiding message, a destination or a peripheral vehicle.

20. The method of claim 14, wherein the light transmission region is at a combiner or a windshield.

21. The method of claim 14, further comprising:
selecting the graphic object in response to determining information related to at least one of a point of interest (POI), a guiding message, a destination or a peripheral vehicle is to be included in the image.

* * * * *